United States Patent [19]
Watanabe et al.

[11] Patent Number: 6,051,444
[45] Date of Patent: Apr. 18, 2000

[54] METHOD OF MANUFACTURE OF LIQUID CRYSTAL DISPLAY DEVICE HAVING CHARACTERISTICS WHICH DIFFER LOCALLY

[75] Inventors: Toshimi Watanabe, Yokohama; Toru Iwane, Kanagawa-ken; Itaru Homma; Takehiko Ueda, both of Tokyo-to, all of Japan

[73] Assignee: Nikon Corporation, Tokyo, Japan

[21] Appl. No.: 09/215,153

[22] Filed: Dec. 18, 1998

[30] Foreign Application Priority Data

Dec. 18, 1997 [JP] Japan .................................. 9-363925

[51] Int. Cl.[7] .................................................. H01L 21/00
[52] U.S. Cl. .............................. 438/30; 438/158; 438/752
[58] Field of Search .............................. 438/30, 149, 151, 438/152, 158, 752

[56] References Cited

U.S. PATENT DOCUMENTS

| | | | |
|---|---|---|---|
| 5,066,105 | 11/1991 | Yoshimoto et al. | 359/58 |
| 5,070,326 | 12/1991 | Yoshimoto et al. | 340/719 |
| 5,119,218 | 6/1992 | Yoshimoto et al. | 359/54 |
| 5,128,785 | 7/1992 | Yohsimoto et al. | 359/58 |
| 5,250,932 | 10/1993 | Yoshimoto et al. | 345/206 |
| 5,550,663 | 8/1996 | Nishizaki et al. | 359/569 |
| 5,576,070 | 11/1996 | Yaniv | 427/510 |
| 5,610,736 | 3/1997 | Asai | 349/42 |
| 5,757,449 | 5/1998 | Nishizaki et al. | 349/104 |
| 5,937,272 | 8/1999 | Tang | 438/30 |

*Primary Examiner*—David Nelms
*Assistant Examiner*—Michael S. Lebentritt

[57] ABSTRACT

A method of manufacturing a liquid crystal display element having characteristics of voltage-transparency, and the like, which differ locally. The method of manufacturing the liquid crystal display device includes a step of injecting a mixture of photohardening resin and liquid crystal between two substrates, and a step of exposing the injected mixture to light which causes photohardening of the mixture. The step of exposing the mixture to light includes exposing at least two pattern regions which become different from each other under photohardening conditions.

20 Claims, 13 Drawing Sheets

GLASS SUBSTRATE 4A
FIRST SURFACE

FIG. 6A

GLASS SUBSTRATE 4B
SECOND SURFACE

5 LIQUID CRYSTALS + PHOTOHARDENING RESIN

METHOD OF MANUFACTURE OF LIQUID CRYSTAL DISPLAY DEVICE HAVING CHARACTERISTICS WHICH DIFFER LOCALLY

CROSS-REFERENCE TO RELATED APPLICATIONS

This application is based upon and claims priority of Japanese Patent Application No. 09-363925 filed Dec. 18, 1997, the contents being incorporated herein by reference.

BACKGROUND OF THE INVENTION

1. Field of the Invention

The present invention relates to a method of manufacturing a high molecular dispersion type liquid crystal display element. More particularly, the present invention relates to a method of manufacturing a high molecular dispersion type liquid crystal display element which produces liquid crystal elements having characteristics which differ locally, such as voltage transparency and the like characteristics.

2. Description of the Related Art

Figure 11A:
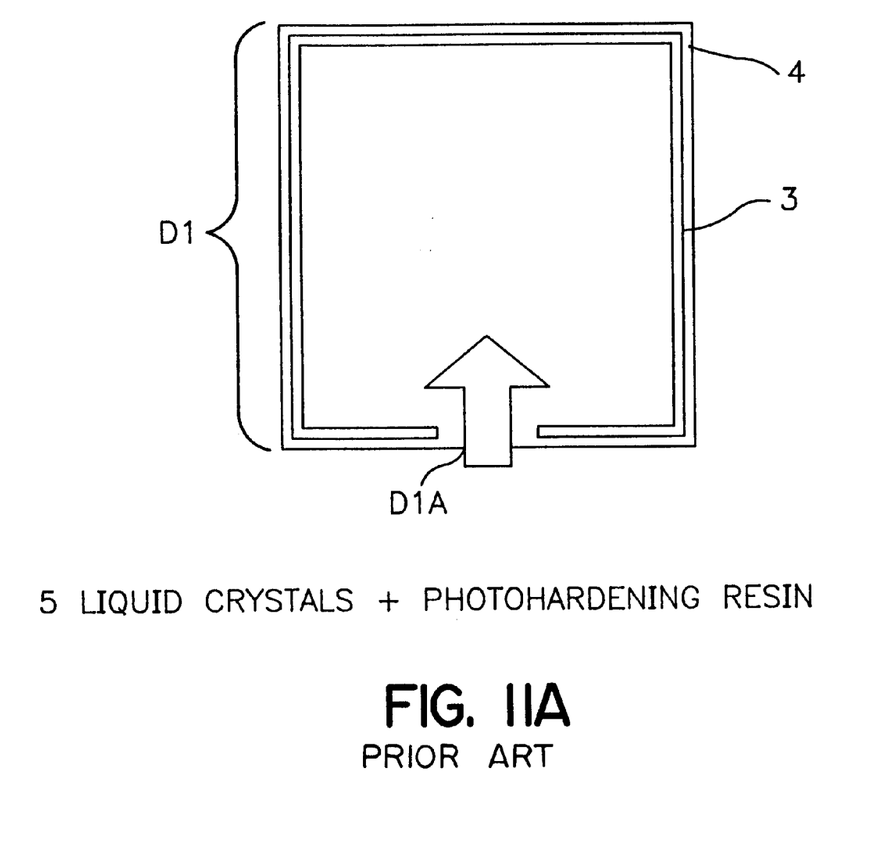
FIGS. 11A and 11B are a plan view and a side view, respectively, illustrating a prior art method of manufacturing a high molecular dispersion liquid crystal display.
Figure 11B:
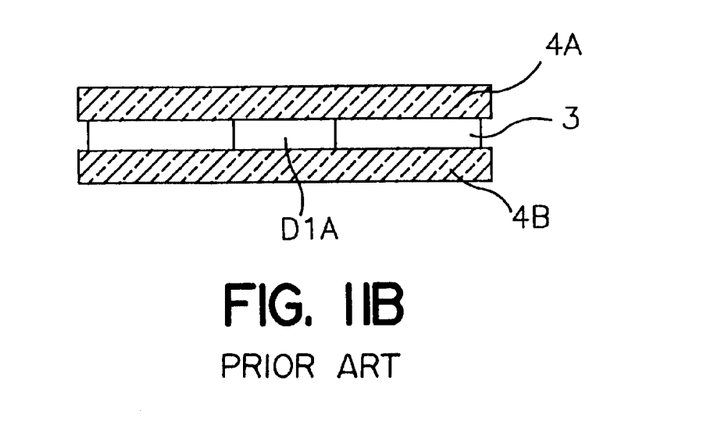
Figure 12A:
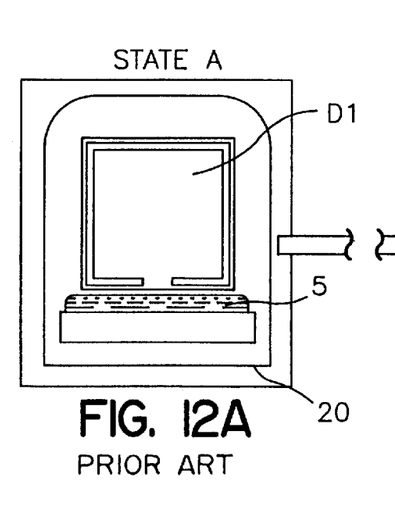
FIGS. 12A and 12B are diagrams illustrating the prior art method of manufacturing a high molecular dispersion liquid crystal display.
Figure 12B:
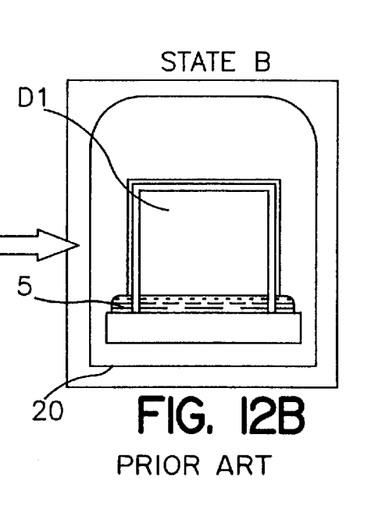
Figure 13:
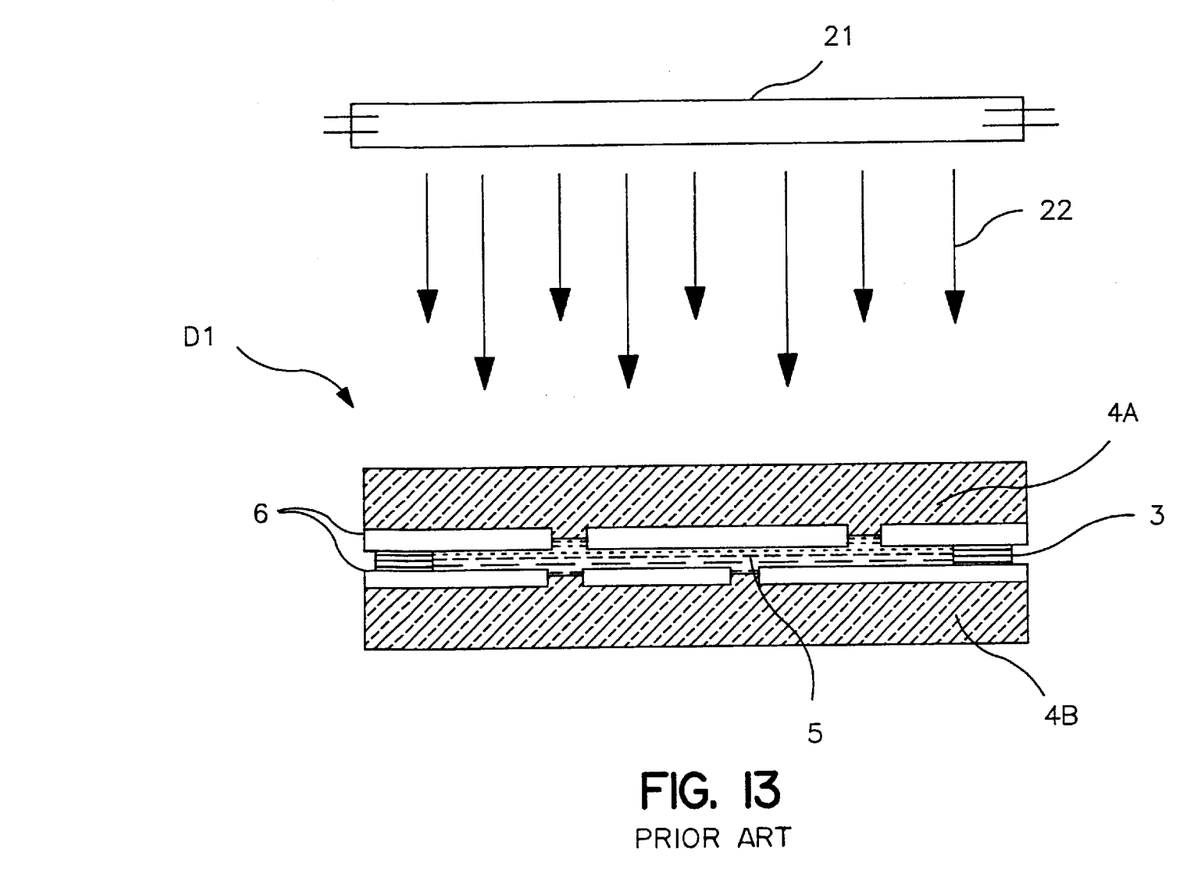
FIG. 13 is a diagram illustrating the prior art method of manufacturing a high molecular dispersion liquid crystal display.

Methods of manufacturing high molecular dispersion type liquid crystal display elements are known. For example, FIGS. 11–13 illustrate a prior art method of manufacturing high molecular dispersion type liquid crystal display elements. The prior art method consists of the process steps described below.

Firstly, as shown in FIG. 13, in process step (1), two glass substrates 4A, 4B are patterned with respective transparent electrodes 6.

Next, in process step (2), the two glass substrates 4A, 4B, with respective opposing transparent electrodes 6 are made to face each other, and, as shown in FIGS. 11A and 11B, the periphery of the glass substrates 4A, 4B is sealed with a sealant 3, except for a liquid crystal injection aperture portion D1A.

In process step (3), the device D1 prepared in process step (2) and a mixture 5 consisting of liquid crystals and a photohardening resin is placed in a reduced pressure container 20 in which a vacuum can be drawn, and, in the state A shown in FIG. 12A, the pressure is reduced.

Continuing, in process step (4), in the state B shown in FIG. 12B, a state of sufficiently reduced pressure, the device D1 is immersed in the mixture 5.

In process step (5), in the state in which the aperture portion D1A of the device D1 is completely occupied within the mixture 5, the pressure of the interior of the reduced pressure container 20 is returned to atmospheric pressure. At this time, because the pressure within the device D1 is reduced, the mixture 5 enters the interior of the device D1 as a result of the atmospheric pressure.

In process step (6), the device D1 is removed from the reduced pressure container 20, and the aperture portion D1 A, through which the mixture 5 had been injected, is completely sealed with sealant.

Finally, as shown in FIG. 13, in process step (7), an exposure process is performed wherein light 22 is irradiated on the device D1 from a light source 21, and the photohardening resin of the mixture 5 is hardened.

Nevertheless, in accordance with the prior art method of manufacturing a liquid crystal display device, the display characteristics are uniform over the whole surface of the liquid crystal. As a result of the uniform display characteristics, a problem occurs because liquid crystal elements cannot be manufactured such that display characteristics locally differ from each other, for example, by changing temperature, and the display functions of the liquid crystal cannot be extended.

SUMMARY OF THE INVENTION

It is an object of the present invention to overcome the above-described problems of the prior art method of manufacturing a liquid crystal display device.

It is another object of the present invention to provide a method of manufacturing liquid crystal elements which produces liquid crystal elements having characteristics which differ locally, such as voltage-transparency and the like characteristics.

Objects and advantages of the present invention are achieved in accordance with embodiments of the present invention with a method of manufacturing a liquid crystal display device comprising the steps of injecting a mixture of photohardening resin and liquid crystal between two substrates; and exposing the mixture to light to photoharden the mixture, wherein the step of exposing the mixture to light includes exposing at least two pattern regions to light, the pattern regions becoming different from each other under photohardening conditions.

In accordance with embodiments of the present invention, the photohardening conditions include at least one of temperature, light intensity, light irradiation time, and spectral distribution.

In accordance with embodiments of the present invention, the photohardening resin is an ultraviolet hardening resin.

In accordance with embodiments of the present invention, the step of exposing the mixture to light comprises controlling the temperature distribution of the mixture with a temperature control device such that the temperature distribution differs according to the pattern regions.

In accordance with embodiments of the present invention, the temperature control device controls the temperature distribution according to the pattern regions by light irradiation.

In accordance with embodiments of the present invention, the step of exposing the mixture to light comprises using a light scanning optical system to expose the photohardening resin to light in different hardening conditions according to the pattern regions.

In accordance with the method of manufacturing a liquid crystal display element of the present invention, an unhardened mixture comprising liquid crystals is hardened by irradiating the mixture with light. By changing the conditions of temperature, light intensity, irradiation time, spectral distribution, and the like, according to pattern regions at the time of light irradiation of the mixture, a liquid crystal display element can be manufactured in which the characteristics of the liquid crystals, for example, voltage-transparency characteristics, are different according to the respective pattern region.

Moreover, in accordance with the method of manufacturing a liquid crystal display element of present invention, during the step of exposing the mixture to light, because the photohardening is performed under photohardening conditions which differ according to the pattern regions, a liquid crystal display element can be manufactured having characteristics which differ according to pattern regions.

Furthermore, in accordance with the method of manufacturing a liquid crystal display element of the present invention, because the voltage-transparency characteristics also depend on the temperature, a liquid crystal display element having display characteristics which differ according to the pattern regions as a result of the temperature can be simply manufactured.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

First Preferred Embodiment

A method of manufacturing a high molecular dispersion type liquid crystal display in accordance with a first preferred embodiment of the present invention will be described below with reference to FIGS. 1–7.

Figure 1:
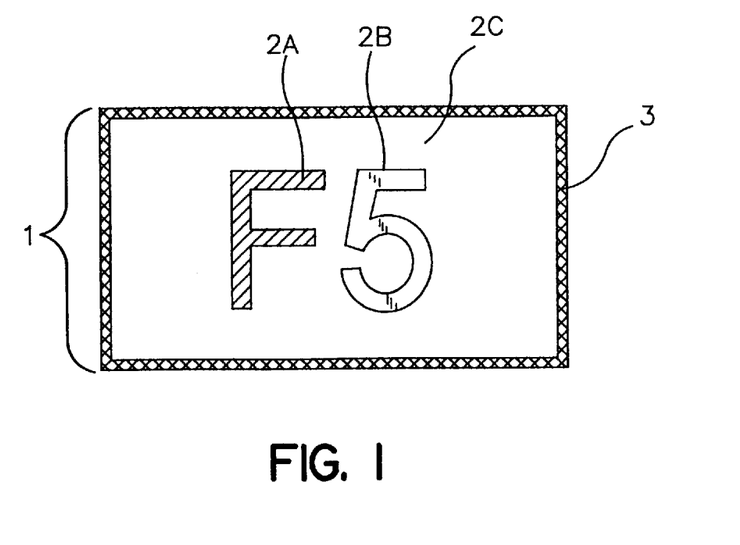
FIG. 1 is a diagram of a liquid crystal display element produced by the method of manufacture in accordance with embodiments of the present invention.

FIG. 1 illustrates a high molecular dispersion type liquid crystal element 1 having three (3) pattern regions with different characteristics, including an alphabetical "F" portion 2A, a numeral "5" portion 2B, and a portion 2C other than "F" or "5". The different characteristics of the pattern regions described herein are voltage-transparency characteristics representing a relationship between the transparency T when a voltage V has been applied to a predetermined electrode of the liquid crystal element 1.

The method of manufacturing the high molecular dispersion type of liquid crystal display in accordance with the first embodiment of the present invention includes process steps (1)–(6) which are similar to the prior art method of manufacturing a liquid crystal display.

Figure 2:
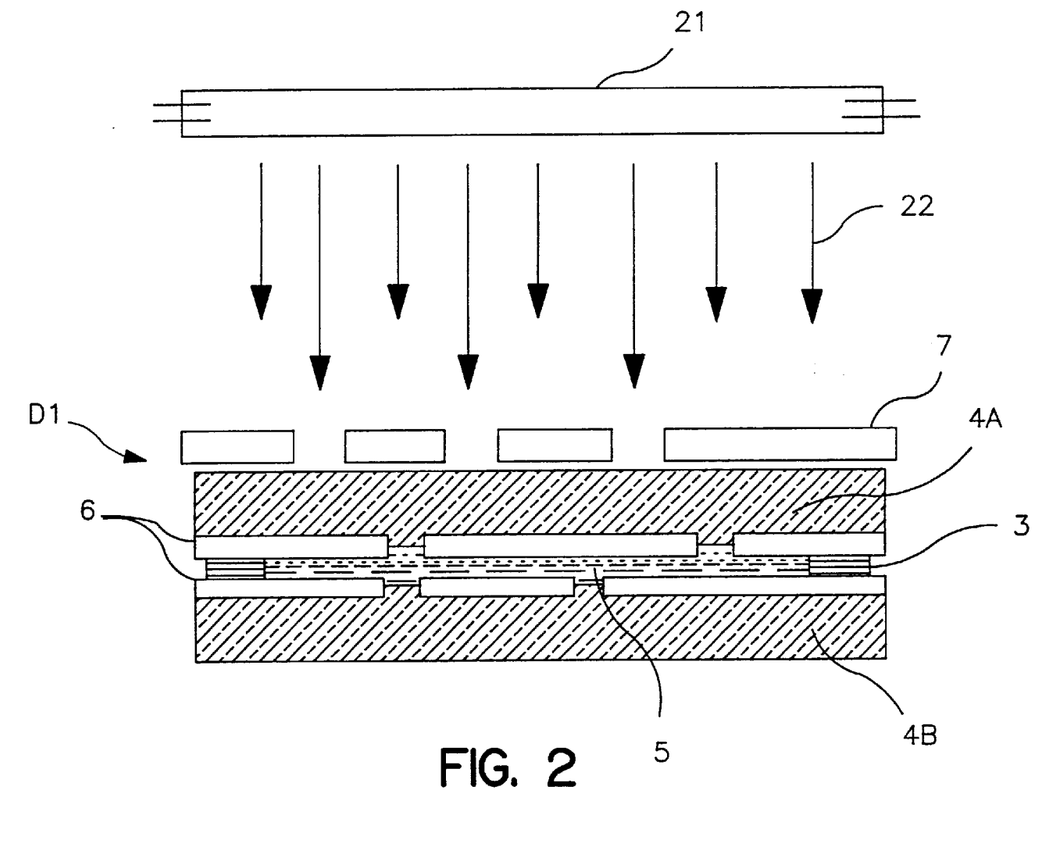
FIG. 2 is a diagram illustrating a method of photohardening a high molecular dispersion type liquid crystal display element in accordance with a first embodiment of the present invention.

As shown in FIG. 2, in the first process step (1), two glass substrates 4A, 4B are patterned with respective transparent electrodes 6.

Next, in process step (2), the two glass substrates 4A, 4B, with respective opposing transparent electrodes 6, are made to face each other, and, as shown in FIGS. 11A and 11B, the periphery of the glass substrates 4A, 4B is sealed with a sealant 3, except for a liquid crystal injection aperture portion D1A.

Continuing, in process step (3), the device D prepared in process step (2) and a mixture 5 comprising liquid crystals and photohardening resin is placed in a reduced pressure container 20 in which a vacuum can be drawn, and, in the state A shown in FIG. 12A, the pressure is reduced.

In process step (4), in the state B shown in FIG. 12B, a state of sufficiently reduced pressure, the element D1 is immersed in the mixture 5.

In process step (5), in the state in which the aperture portion D1A of the device D1 is completely immersed within the mixture 5, the pressure of the interior of the reduced pressure container 20 is returned to atmospheric pressure. At this time, because the pressure is reduced within the element D1, the mixture 5 enters the interior of the element D1 due to the atmospheric pressure.

In process step (6), the element D1 is removed from the reduced pressure container 20, and the aperture portion D1A, through which the mixture 5 had been injected, is completely sealed with sealant.

Next, the device is exposed to light, in accordance with a process which differs from the prior art method, as described below.

As shown in FIG. 2, in process step 7-1, light 22 is irradiated on the device D1 from a light source 21, causing the photohardening resin of the mixture 5 to harden. Further, as shown in FIG. 2, photohardening is performed in a state in which a mask 7 is inserted between the device D1 and the hardening light source 21.

Figure 3:
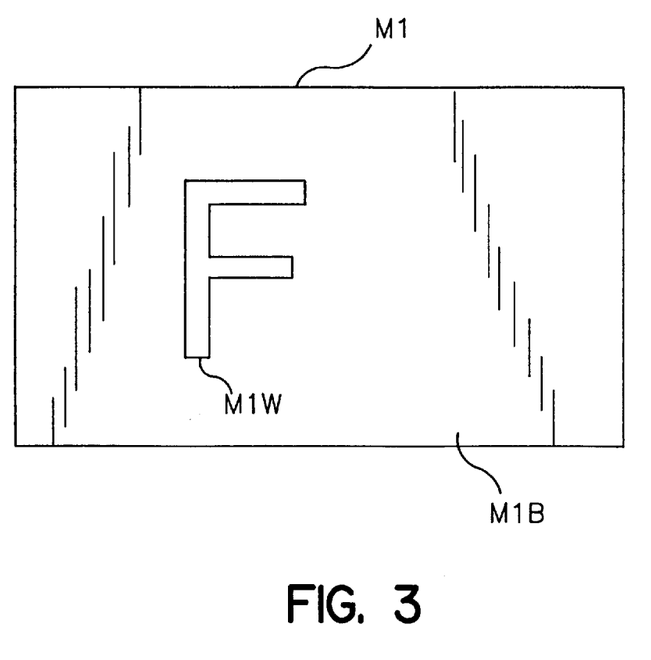
FIG. 3 is a diagram illustrating a mask used when photohardening the high molecular dispersion type liquid crystal display element in accordance with the first embodiment of the present invention.

As shown in FIG. 3, a patterned mask M1 is used as the mask 7. The mask M1 includes a pattern region M1W having the same pattern as 2A in FIG. 1 (letter "F") which is whited out. The patterned mask M1 includes a blackened portion M1B which screens the hardening light 22 from the hardening light source 21, and a white region M1W which allows the hardening light rays 22 from the hardening light source 21 to pass through. The hardening conditions of process step (7-1), for example, temperature, irradiation intensity, irradiation time, spectral distribution, wavelength of the irradiating light, etc., are denoted as "conditions C1".

Furthermore, ultraviolet light (UV light) is generally used as the hardening light which causes the photohardening resin to harden.

Figure 4:
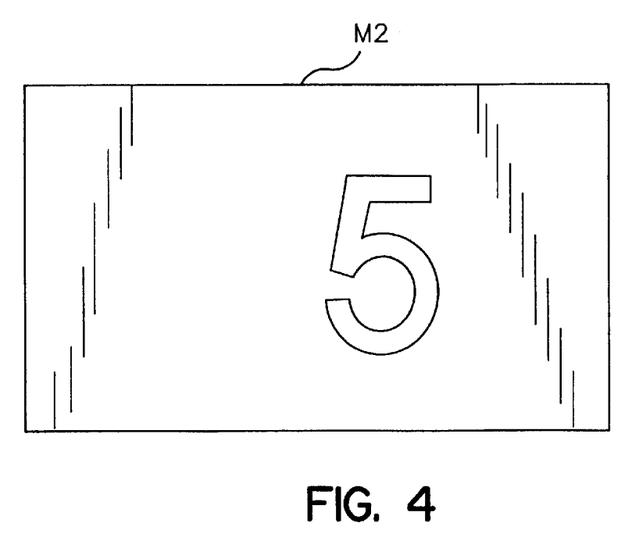
FIG. 4 is a diagram illustrating a mask used when photohardening the high molecular dispersion type liquid crystal display element in accordance with the first embodiment of the present invention.

Continuing, in process step (7-2), a mask M2 patterned as shown in FIG. 4 is placed in the position of the mask 7 shown in FIG. 2, and hardening is performed under hardening conditions C2 different from those of process step (7-1). The mask M2 corresponds to the pattern region 2B, and includes the numeral "5" whited out.

Figure 5:
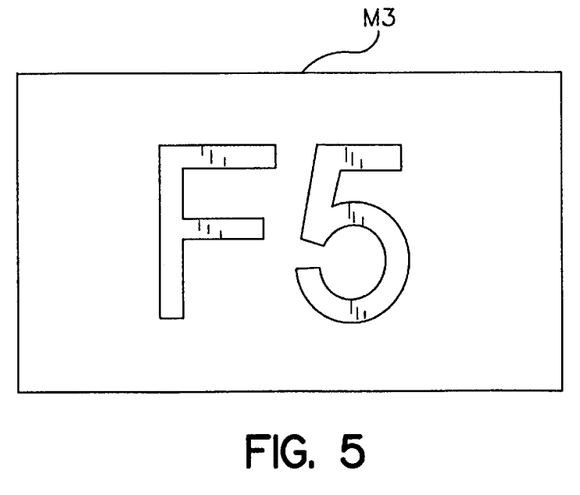
FIG. 5 is a diagram illustrating a mask used when photohardening the high molecular dispersion type liquid crystal display element in accordance with the first embodiment of the present invention.

Next, in process step (7-3), a mask M3, patterned as shown in FIG. 5, is placed in the position of the mask 7 of FIG. 2, and hardening is performed under hardening conditions C3. The mask M3 corresponds to the pattern region 2C shown in FIG. 1, and is transparent to the hardening light in the portions outside the "F" and the "5".

In the above-described manner, a liquid crystal display element can be manufactured having respective pattern regions which differ in their display characteristics, because the pattern regions 2A, 2B, 2C are respectively exposed to light under different hardening conditions.

Figure 6A:
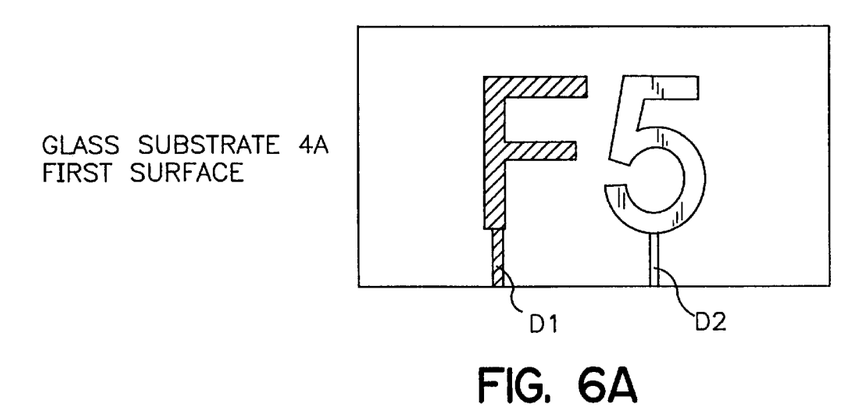
FIGS. 6A and 6B are diagrams showing a pattern of transparent electrodes applied to a glass substrate of the high molecular dispersion type liquid crystal display element in accordance with the first embodiment of the present invention.
Figure 6B:
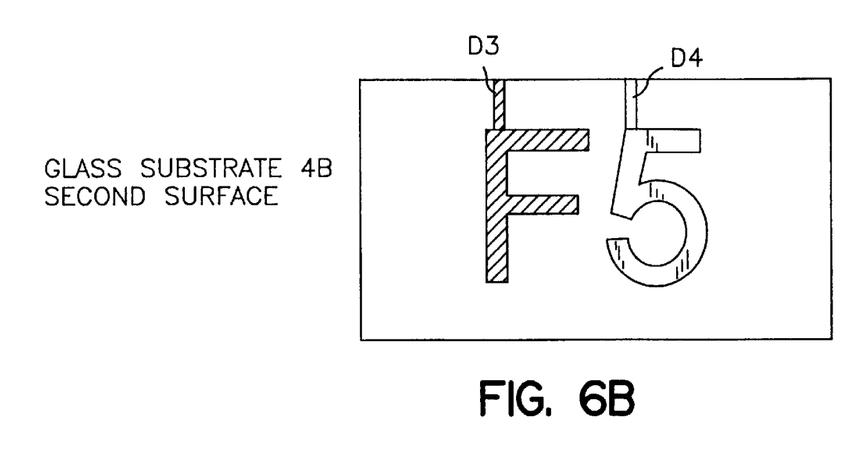

FIGS. 6A and 6B show an example of a pattern of transparent electrodes applied to glass substrates 4A, 4B of a liquid crystal display element in the process of manufacturing a liquid crystal display device in accordance with the first embodiment of the present invention. The transparent electrodes D1, D2 are applied to a first surface (display surface) of the glass substrate 4A (FIG. 6A), and the transparent electrodes D3, D4 are applied to a second surface (back surface) of the glass substrate 4B (FIG. 6B).

Figure 7:
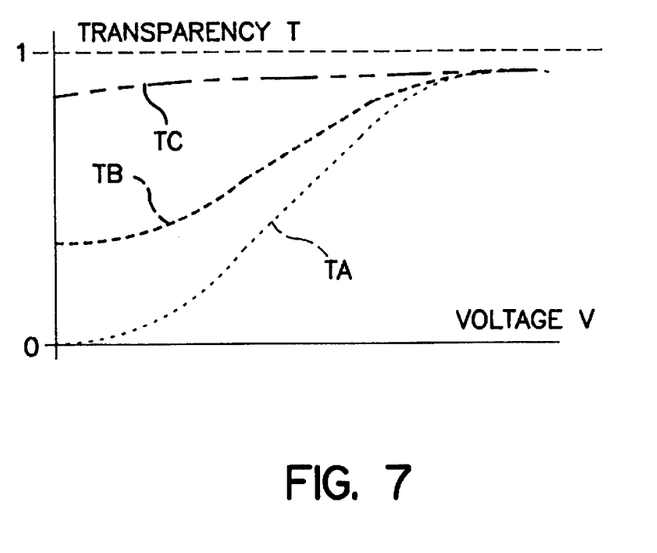
FIG. 7 is a graph of a voltage-transparency characteristic of each pattern region in accordance with the first embodiment of the present invention.

FIG. 7 is a graph showing the voltage transparency characteristics (TA) of a portion of the region 2A, the voltage transparency characteristics (TB) of a portion of the region 2B, and the voltage transparency characteristics (TC) of a portion of the region 2C in accordance with the first embodiment of the present invention.

As shown in FIG. 7, when a voltage V1 is applied to the electrodes D1, D3, and a voltage V2 is applied to the electrodes D2, D4, of the liquid crystal display element 1 in accordance with the first embodiment of the invention, the transparency of each of the regions 2A, 2B changes according to the respective voltages V1, V2, and can extinguish and light up the regions 2A, 2B. Furthermore, because the transparency of the region 2C, to which no voltage is applied, is close to one (1), only the regions 2A, 2B can extinguish and light up.

The first embodiment of the invention is not limited to the above-described process steps, and modifications are possible. For example, an optical system may be arranged between the mask and the liquid crystal display element to project a mask image on the liquid crystal display element. Moreover, by making the optical system an enlarging optical system, the mask can also be reduced in size.

Second Preferred Embodiment

Figure 8:
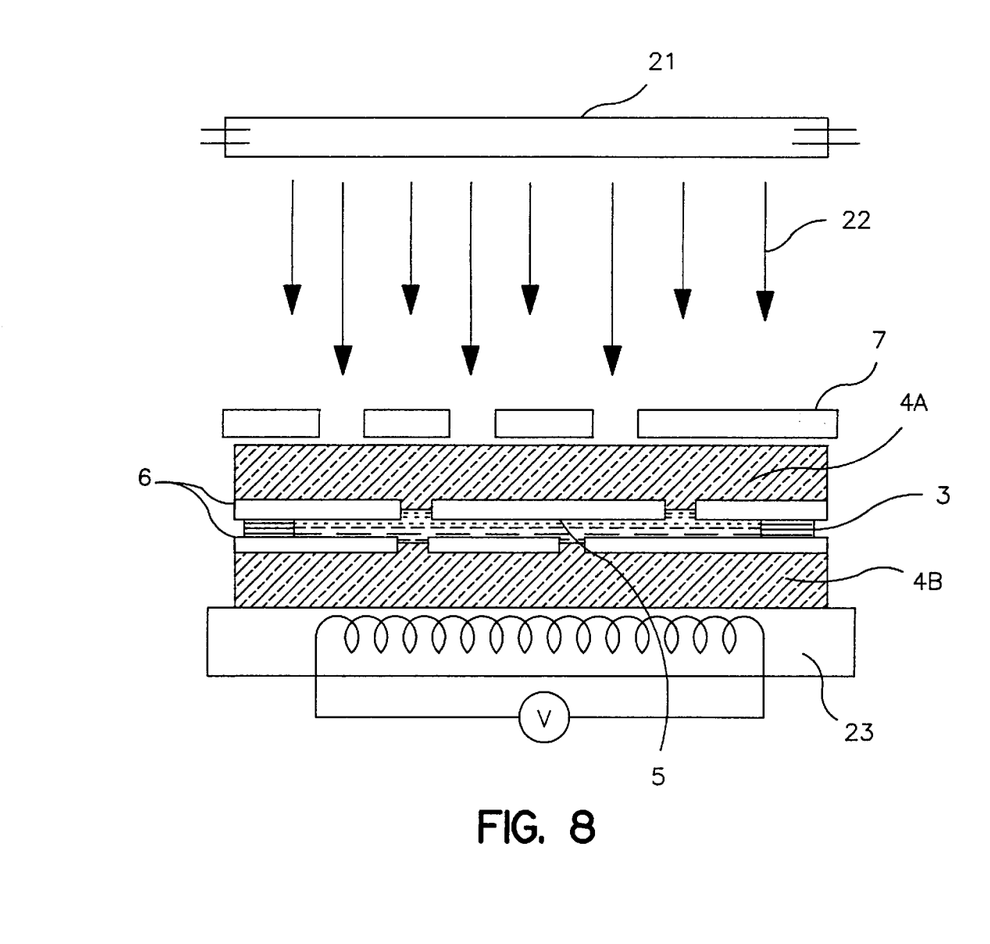
FIG. 8 is a diagram illustrating a method of hardening a high molecular dispersion type liquid crystal display element by exposure to light in accordance with a second embodiment of the present invention.

A second preferred embodiment of the present invention will now be described below with reference to FIG. 8. As shown in FIG. 8, a light exposure process is performed in a manner similar to the first embodiment of the invention using a temperature control device 23 which can control the temperature distribution according to the pattern region. In accordance with the second preferred embodiment, when the conditions of photohardening, other than the temperature, are the same, the same mask can be used with the temperature control device 23 controlling the temperature distribution according to the pattern region, causing each of the pattern regions to harden at the same time. For example, when the photohardening conditions of irradiation intensity, irradiation time, and wavelength distribution of the light are the same, other than the temperature, the same mask can be used. More particularly, in accordance with the second preferred embodiment of the present invention, in comparison with the first embodiment of the invention, fewer process steps are needed to photoharden a plurality of pattern regions.

Third Preferred Embodiment

Figure 9:
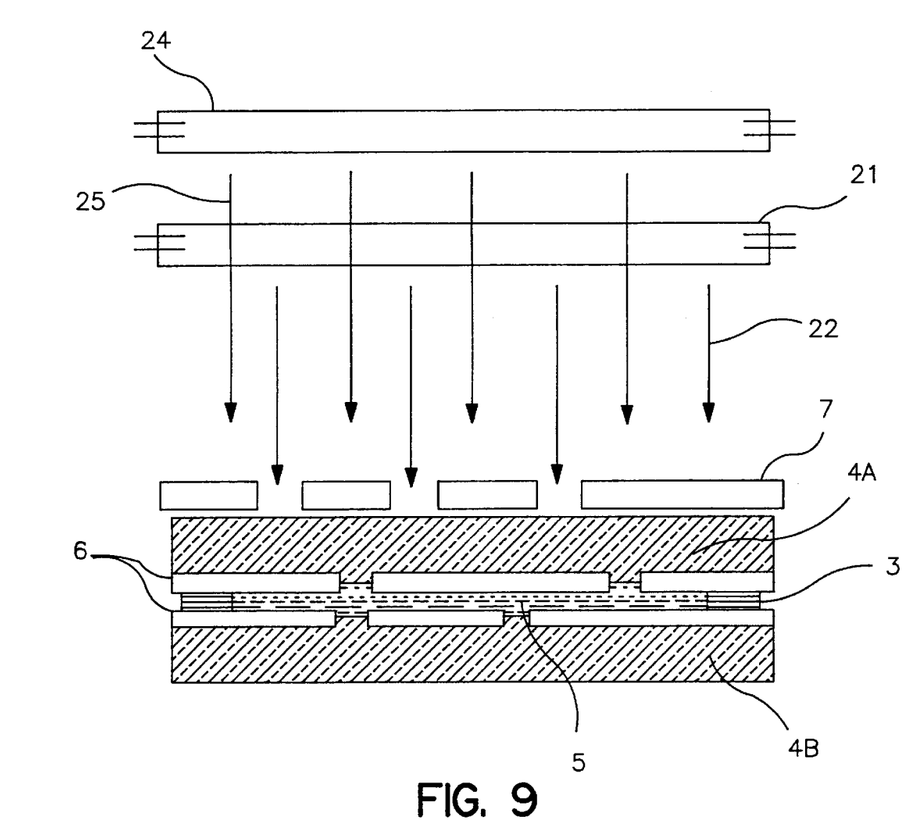
FIG. 9 is a diagram illustrating a method of hardening a high molecular dispersion type liquid crystal display element by exposure to light in accordance with a third embodiment of the present invention.

A third preferred embodiment of the present invention will be described below with reference to FIG. 9. As shown in FIG. 9, in accordance with the third preferred embodiment, the temperature control device 23 of the second embodiment is eliminated and a heating light source 24 is substituted therefor to control the temperature distribution. In accordance with the third embodiment of the invention, the light exposure process is performed using the heating light source 24 to control the temperature distribution and a light source 21 for photohardening. In accordance with the third embodiment shown in FIG. 9, the heat rays 25 from the heating light source 24 can control the temperature distribution by simultaneously irradiating with the photohardening light 22 by the hardening light source 21. Furthermore, ultraviolet light (UV light) is generally used as the hardening light from the hardening light source 21. Moreover, light having a wavelength longer than 500 nm is preferably used as the heat rays 25 of the heating light source 24. More particularly, infrared rays (IR light) having good thermal effectiveness are preferably used as the heat rays 25 of the heating light source 24.

Fourth Preferred Embodiment

A fourth preferred embodiment of the present invention will now be described below with reference to FIG. 10. In accordance with the fourth embodiment of the invention, the mask used in the first through third embodiments is not used, and the photohardening process is performed using a polygonal mirror and the like light scanning optical system.

Figure 10:
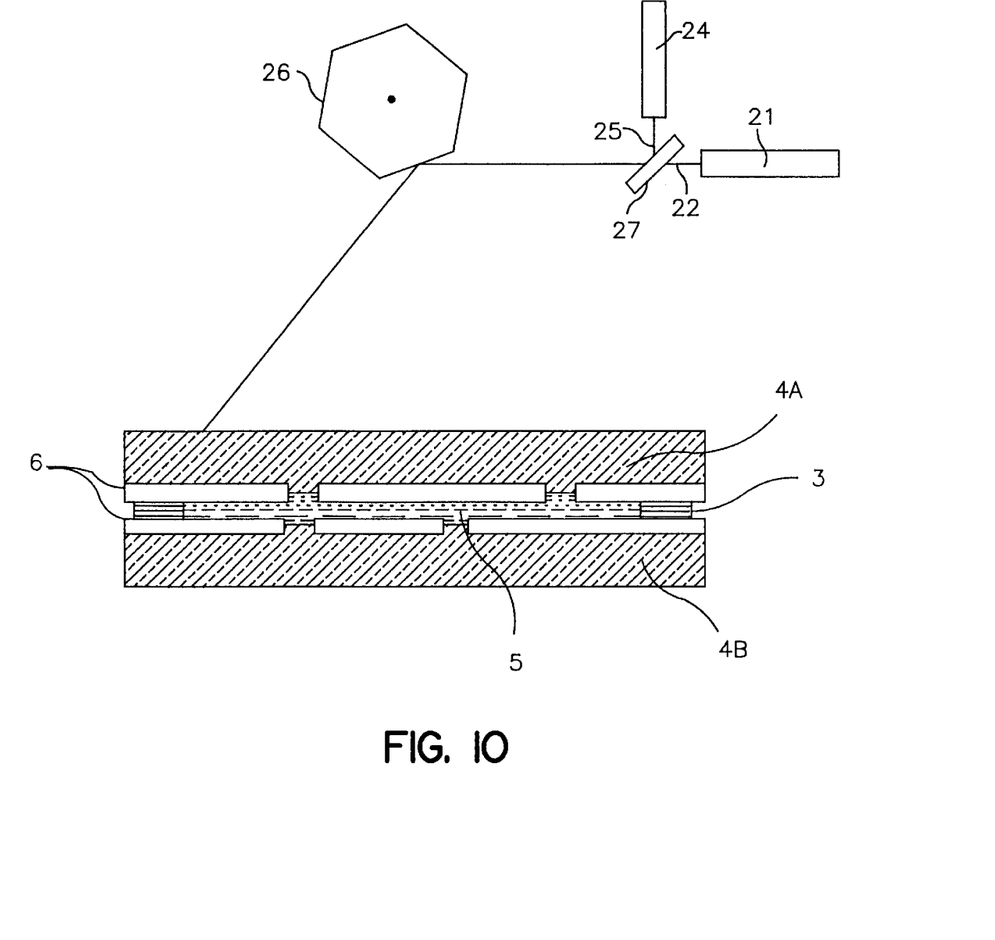
FIG. 10 is a diagram illustrating a method of hardening a high molecular dispersion type liquid crystal display element by exposure to light in accordance with a fourth embodiment of the present invention.

As shown in FIG. 10, heat rays 25 from a heating light source 24 are reflected by a heat ray reflecting mirror 27, and the reflected heat rays are combined with hardening light 22 from a hardening light source 21. The combined light is deflected by a light scanning optical system 26, and irradiates the unhardened mixture 5 while scanning the mixture 5. During the scanning, the amount of irradiation of the heat rays from the heating light source 24 changes according to the pattern region. The amount of irradiation of the heat rays 25 can be changed by changing the irradiation intensity, irradiation time, etc., of the heat rays. The temperature distribution can be controlled in this manner according to the pattern region.

Furthermore, in order to locally change the process of photohardening, keeping the temperature constant, when changing the irradiation intensity, irradiation time, etc. of the photohardening light, the heating light source 24 is unnecessary.

In accordance with embodiments of the present invention, the heat rays of the heating light source 24 are not limited to infrared rays. Any heat rays may be used which can cause a temperature change of the material, other than photohardening wavelengths of the photohardening adhesive which is used. However, it is necessary to set the wavelength of the heat rays 25 of the heating light source 24 to not include wavelengths which cause hardening of the photohardening adhesive.

Moreover, in accordance with embodiments of the present invention, ultraviolet laser light (excimer laser, semiconductor laser) may be used to harden minute regions with the hardening light source 21. Moreover, if a semiconductor laser is used in the heating light source 24, the hardening device can be made smaller.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of manufacturing a liquid crystal display device, comprising the steps of:

injecting a mixture of photohardening resin and liquid crystal between two substrates; and exposing the injected mixture to light causing photohardening of the mixture, wherein the step of exposing the injected mixture includes exposing at least two pattern regions which become different from each other under photohardening conditions.

2. A method of manufacturing a liquid crystal display device as recited in claim 1, wherein the photohardening conditions include at least one of temperature, light intensity, light irradiation time, and spectral distribution.

3. A method of manufacturing a liquid crystal display device as recited in claim 1, wherein the photohardening resin is an ultraviolet hardening resin.

4. A method of manufacturing a liquid crystal display device as recited in claim 1, wherein the step of exposing the mixture to light further comprises changing the temperature distribution of the mixture with a temperature control device such that the temperature distribution differs according to the pattern regions.

5. A method of manufacturing a liquid crystal display device as recited in claim 4, wherein the temperature control device controls the temperature distribution according to the pattern regions by light irradiation.

6. A method of manufacturing a liquid crystal display device as recited in claim 5, wherein the temperature control device is a heating light source using infrared radiation to control the temperature distribution.

7. A method of manufacturing a liquid crystal display device as recited in claim 1, wherein the step of exposing the mixture to light comprises using a light scanning optical system to expose the mixture to light under different photohardening conditions according to the pattern regions.

8. A method of manufacturing a liquid crystal display device as recited in claim 7, wherein the step of exposing the mixture to light further comprises combining heat rays from a heating light source with photohardening light from a photohardening light source, and deflecting the combined heat rays and photohardening light with the light scanning optical system to expose the mixture.

9. A method of manufacturing a liquid crystal display device as recited in claim 1, wherein the step of exposing the injected mixture comprises using a patterned mask to form the at least two pattern regions.

10. A method of manufacturing a liquid crystal display device as recited in claim 1, wherein the step of exposing the injected mixture comprises using an optical system to project the at least two pattern regions.

11. A method of manufacturing a liquid crystal display element, comprising the steps of:

forming a device by injecting a mixture of photohardening resin between two substrates;

exposing a first pattern region of the injected mixture to light under first photohardening conditions;

exposing a second pattern region of the injected mixture to light under second photohardening conditions, wherein the steps of exposing the injected mixture to light under the first and second photohardening conditions forms respective pattern regions having different display characteristics.

12. A method of manufacturing a liquid crystal display device as recited in claim 11, wherein the first and second photohardening conditions include at least one of temperature, light intensity, light irradiation time, spectral distribution and wavelength of the irradiating light.

13. A method of manufacturing a liquid crystal display device as recited in claim 11, wherein the photohardening resin is an ultraviolet hardening resin.

14. A method of manufacturing a liquid crystal display device as recited in claim 11, wherein the step of exposing a first pattern region of the injected mixture comprises using a first patterned mask to form the first pattern region, and the step of exposing a second pattern region of the injected mixture comprises using a second patterned mask to form the second pattern region.

15. A method of manufacturing a liquid crystal display device as recited in claim 11, wherein the steps of exposing the first and second pattern regions of the injected mixture comprise using an optical system to project the first and second pattern regions.

16. A method of manufacturing a liquid crystal display device as recited in claim 11, wherein the steps of exposing a first and second pattern region comprise changing the temperature distribution of the mixture with a temperature control device such that the temperature distribution differs according to the first and second pattern regions.

17. A method of manufacturing a liquid crystal display device as recited in claim 16, wherein the temperature control device controls the temperature distribution according to the first and second pattern regions by light irradiation.

18. A method of manufacturing a liquid crystal display device as recited in claim 16, wherein the temperature control device is a heating light source using infrared radiation to control the temperature distribution.

19. A method of manufacturing a liquid crystal display device as recited in claim 11, wherein the steps of exposing the first and second pattern regions of the injected mixture to light comprise using a light scanning optical system to expose the mixture to light under the first and second photohardening conditions according to the first and second pattern regions, respectively.

20. A method of manufacturing a liquid crystal display device as recited in claim 19, wherein the steps of exposing the first and second pattern regions of the injected mixture to light further comprise combining heat rays from a heating light source with photohardening light from a photohardening light source and deflecting the combined heat rays and photohardening light with the light scanning optical system to expose the first and second pattern regions of the injected mixture to light under the first and second photohardening conditions, respectively.

* * * * *

UNITED STATES PATENT AND TRADEMARK OFFICE
CERTIFICATE OF CORRECTION

PATENT NO.  : 6,051,444
DATED       : April 18, 2000
INVENTOR(S) : Toshimi Watanabe, et al.

Page 1 of 1

It is certified that error appears in the above-identified patent and that said Letters Patent is hereby corrected as shown below:

Title Page,
[56] References Cited, U.S. PATENT DOCUMENTS, change
"5,128,785  7/1992  Yohsimoto, et al." to -- 5,128,785  7/1992  Yoshimoto, et al. --.

Column 7,
Line 63, after "resin" insert -- and liquid crystal --.

Signed and Sealed this

Twenty-fourth Day of July, 2001

Attest:

NICHOLAS P. GODICI
Attesting Officer    Acting Director of the United States Patent and Trademark Office